US006857181B2

(12) United States Patent
Lo et al.

(10) Patent No.: US 6,857,181 B2
(45) Date of Patent: Feb. 22, 2005

(54) METHOD OF MAKING A T-SHAPED WRITE HEAD WITH LESS SIDE WRITING

(75) Inventors: Jyh-Shuey (Jerry) Lo, San Jose, CA (US); Timothy J. Moran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 10/217,768

(22) Filed: Aug. 12, 2002

(65) Prior Publication Data

US 2004/0027729 A1 Feb. 12, 2004

(51) Int. Cl.[7] .......................... G11B 5/127; H04R 31/00
(52) U.S. Cl. ................. 29/603.15; 29/603.07; 29/603.12; 29/603.13; 29/603.14; 29/603.15; 216/65; 360/121; 360/123; 360/126; 360/317; 427/127; 427/128
(58) Field of Search ................. 29/603.07–603.17; 216/65; 360/121–127, 317; 427/127, 128

(56) References Cited

U.S. PATENT DOCUMENTS

| | | | |
|---|---|---|---|
| 5,285,340 A | * | 2/1994 | Ju et al. ................. 360/119 |
| 5,578,342 A | | 11/1996 | Tran et al. ............... 427/131 |
| 5,652,687 A | * | 7/1997 | Chen et al. ............. 360/126 |
| 5,726,841 A | | 3/1998 | Tong et al. .............. 360/122 |
| 5,734,533 A | | 3/1998 | Nepela ................... 360/119 |
| 5,804,085 A | | 9/1998 | Wu et al. ................. 216/22 |
| 5,874,010 A | | 2/1999 | Tao et al. ................. 216/22 |
| 6,026,559 A | | 2/2000 | Ishiwata ............... 29/603.14 |
| 6,069,775 A | | 5/2000 | Chang et al. ........... 360/126 |
| 6,172,848 B1 | * | 1/2001 | Santini .................. 360/126 |
| 6,510,022 B1 | * | 1/2003 | Lahiri et al. ............ 360/126 |

FOREIGN PATENT DOCUMENTS

| | | | | |
|---|---|---|---|---|
| JP | 07176014 A | * | 7/1995 | .......... G11B/5/31 |
| JP | 11-149620 | | 6/1999 | .......... G11B/5/31 |
| JP | 11-154307 | | 6/1999 | .......... G11B/5/31 |
| JP | 11-293480 | | 10/1999 | .......... G11B/5/31 |

OTHER PUBLICATIONS

"Response of RL network with piecewise linear inductance as a magnetic write head model"; Jury, J.C.; J.H.; Magnetics, IEEE Transactions on, vol.: 37, Issue: 3, May 2001; pp.: 1137–1140.*

* cited by examiner

Primary Examiner—A. Dexter Tugbang
Assistant Examiner—Paul D Kim
(74) Attorney, Agent, or Firm—Ervin F. Johnston

(57) ABSTRACT

First, second and third pole tip components of a write head are formed with the second pole tip located between the first and third components and a write gap layer located between the first and second pole tip components. The second pole tip is formed with a width that defines a track width of the write head. The third pole tip component is formed with top and bottom surfaces wherein the bottom surface interfaces a top surface of the second pole tip component and has a width equal to the track width and wherein the top surface of the third pole tip has a width greater than the track width.

9 Claims, 7 Drawing Sheets

METHOD OF MAKING A T-SHAPED WRITE HEAD WITH LESS SIDE WRITING

BACKGROUND OF THE INVENTION

1. Field of the Invention

The present invention relates to a method of making a T-shaped write head with less side writing and, more particularly, to a T-shaped write head wherein an uppermost pole tip component at the ABS has slanted surface portions which minimize flux leakage between the uppermost pole tip component and a bottommost pole tip component.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

A write head typically employs ferromagnetic first and second pole pieces which are capable of carrying flux signals for the purpose of writing the magnetic impressions into the track. Each of the first and second pole pieces has a pole tip, a yoke and a back gap with the yoke being located between the pole tip and the back gap. The pole tips are located at the ABS and the back gaps are magnetically connected at a recessed location within the write head. At least one coil layer is embedded in an insulation stack between the yokes of the first and second pole pieces. A nonmagnetic write gap layer is located between the pole tips. Processing circuitry digitally energizes the write coil which induces flux signals into the first and second pole pieces. The flux signals bridge across the write gap at the ABS so as to write the aforementioned magnetic impressions or bits into the track of the rotating disk. The thinner the thickness of the write gap layer, the greater the number of bits the write head can write into the track.

A write head is typically rated by its areal density which is a product of its linear bit density and its track width density. The linear bit density is the number of bits which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). As discussed hereinabove, the linear bit density depends upon the thickness of the write gap layer. The track width density is directly dependent upon the width of the second pole tip at the ABS. Efforts over the years to increase the areal density of write heads have resulted in computer storage capacities increasing from kilobytes to megabytes to gigabytes.

The first and second pole pieces are typically fabricated by frame plating. Photoresist is employed to provide the frame and a seed layer is employed to provide a return path for the plating operation. A typical sequence for fabricating a pole piece is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist and then plate the pole piece in the opening up to a desired height.

The magnetic moment of each pole piece is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, the aforementioned magnetic flux fringes across the write gap layer between the first and second pole pieces impressing a positive or negative bit in the track of the rotating magnetic disk. As the write current frequency is increased, the linear bit density is also increased. An increase in the linear bit density is desirable in order to increase the aforementioned areal density which provides a computer with increased storage capacity.

One type of write head is referred to as a T-shaped write head. A T-shaped write head typically has three layers of soft magnetic material exposed at the ABS to the disk which are referred to as P1, P2 and P3. P1 refers to the lower pole while P2 and P3 are joined together and comprise the upper pole. By design, the lateral dimension of the P2 layer defines the width of the magnetic bits on the disk. One problem with these heads is that the lateral dimension of P3 is typically wider than P2. Therefore, the outer regions of P3 can disturb the magnetic material in bits other than the one being written, which is referred to as a bit definition problem. This occurs because the head produces a field in locations other than the location desired, because of the extra magnetic material in the P3 layer which is outside the width of the P2 layer.

The upper pole is typically fabricated in several stages, namely: P2 plating, P2 insulator fill deposition, P2 planarization and P3 plating. Each of these steps consists of several smaller steps, such as depositions, etchings and photolithography patterning steps.

The P2 planarization step is very important since it determines the structure of the interface between P2 and P3. This step is usually performed in such a way that the P2 layer and the P2 insulator fill layer are planarized with their top surfaces coplanar. The P3 layer is then formed onto a nearly flat surface. Because of process variations the P3 width must be made wider than the P2 width, which means that P3 always contains extra magnetic material outside the width of P2. This extra magnetic material is a problem partly because a right angle is formed at the lower corners of P3. It is widely known that magnetic material which is shaped into sharp corners has a tendency to produce large magnetic fields.

SUMMARY OF THE INVENTION

The present invention combats the aforementioned bit definition problem by altering the shape of the upper pole. In the present invention, this is achieved by adding a "fill shaping" step in between the P2 planarization step and the P3 plating step. The fill shaping step is intended to change the shape of fill material so that the P3 layer can be fabricated with lower corners with angles greater than 90°.

The fill shaping step involves several smaller steps. After forming P2 a nonmagnetic electrically nonconductive fill shaping layer is formed and planarized with its top surface coplanar with the top surface of P2, which step is referred to hereinabove as P2 planarization. Next, top surfaces of the shaping layer and P2 are ion milled which forms a depression in the top of P2 which has a flat bottom and sloping side surfaces. The ion milling is preferably with argon (Ar) ions at an angle between 0° to 10° to a normal to the major planes of the layers. The P2 material is a soft magnetic material such as nickel iron (NiFe) and the fill material is preferably alumina ($Al_2O_3$). The depression is due to the fact that the milling rate of P2 is approximately twice as fast as the milling rate of the shaping layer. The formation of the depression in a pole tip component relative to a shaping layer is taught in commonly assigned U.S. Pat. No. 6,069,775 which is incorporated by reference herein. Next, a seed layer, such as copper (Cu), is sputtered onto the layers followed by the formation of a photoresist frame for the making of P3. P3 is then electroplated and the resist frame is removed. P3 now has a bottom surface which has first, second, third, fourth and fifth surface portions. The first surface portion, which is the bottommost surface portion, interfaces the top surface portion of P2 so as to magnetically couple P2 and P3. The second and third surface portions are parallel to the first surface portion. The fourth surface portion extends at an angle between the first surface portion and the second surface portion and the fifth surface portion extends at an angle between the first surface portion and the third surface portion. The second and third surface portions now terminate in first and second corners of P3 which are at a greater distance from P1 than present in the prior art. Accordingly, with the present invention side writing has been minimized. In another embodiment of the invention the third pole tip component has sixth and seventh bottom surface portions that are outboard of and contiguous with the second and third bottom surface portions so as to still further minimize side writing.

An object of the present invention is to provide a method of making a T-shaped write head which has minimum side writing.

Another object is to provide a T-shaped write head made according to the method of the present invention.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
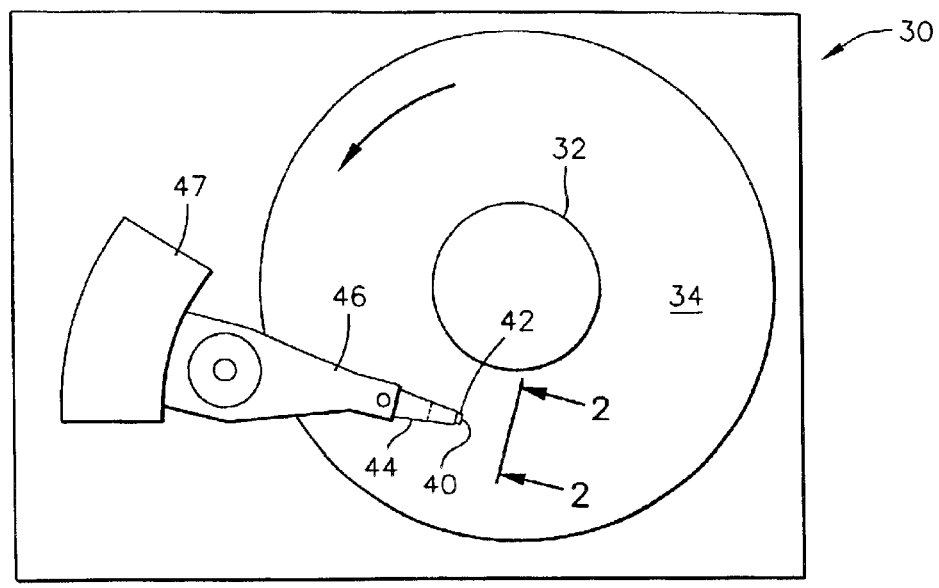
FIG. 1 is a plan view of an exemplary magnetic disk drive.
Figure 2:
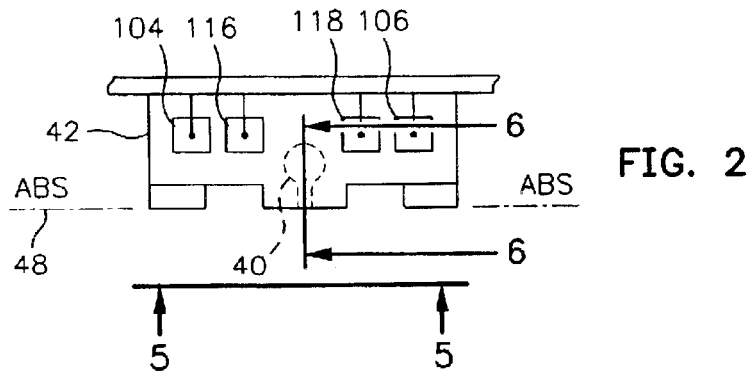
FIG. 2 is an end view of a slider with a magnetic head of the disk drive as seen in plane 2—2 of FIG. 1.
Figure 3:
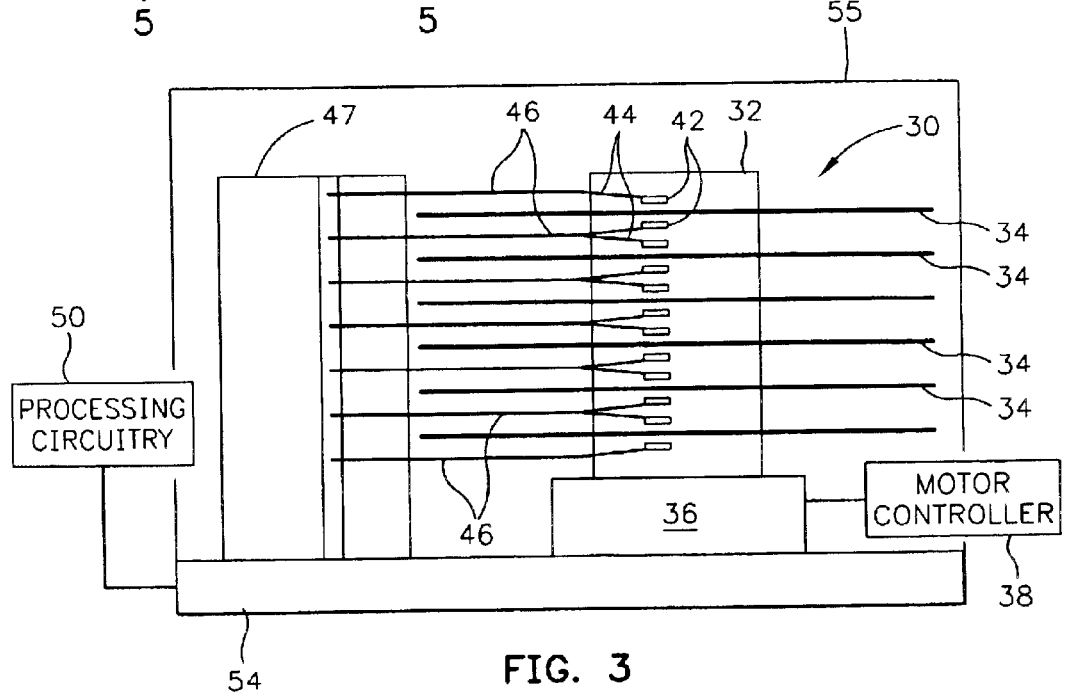
FIG. 3 is an elevation view of the magnetic disk drive wherein multiple disks and magnetic heads are employed.
Figure 4:
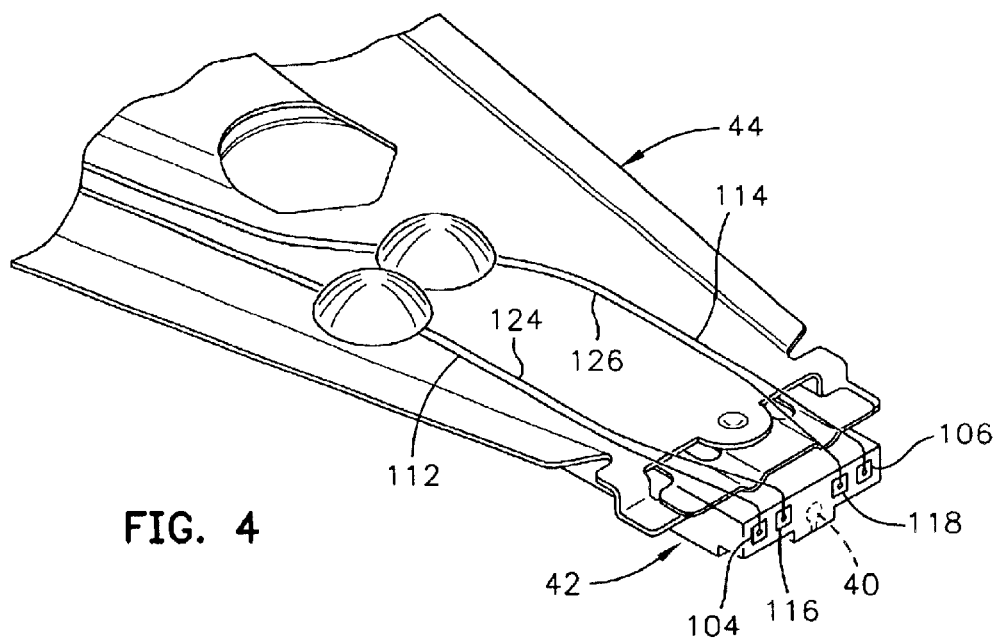
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
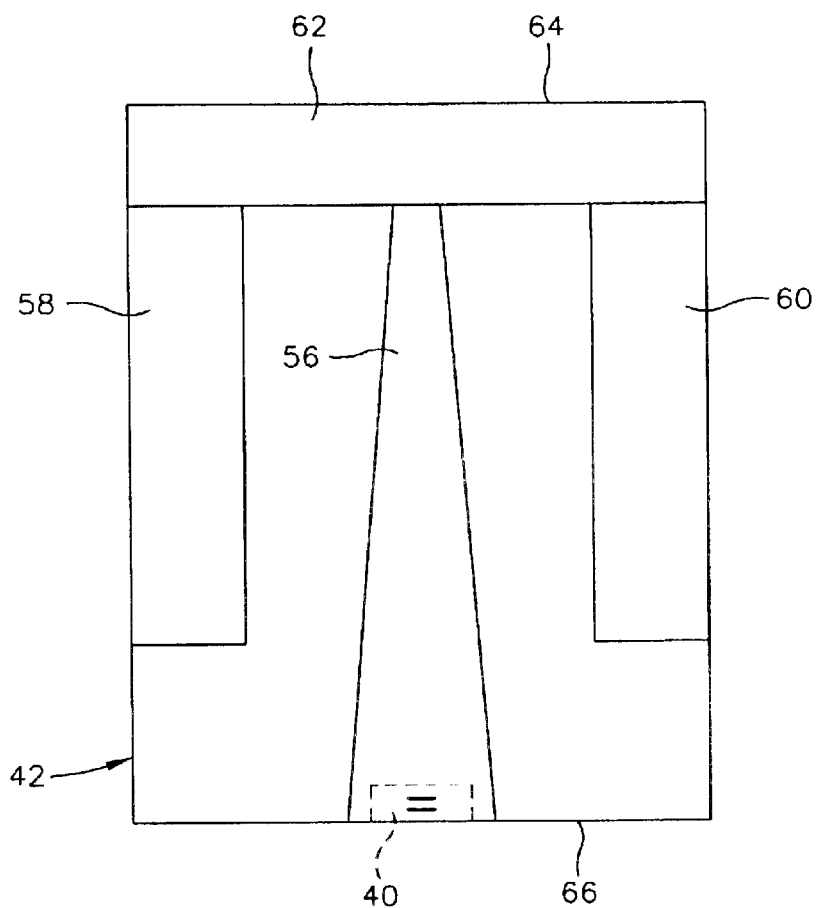
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
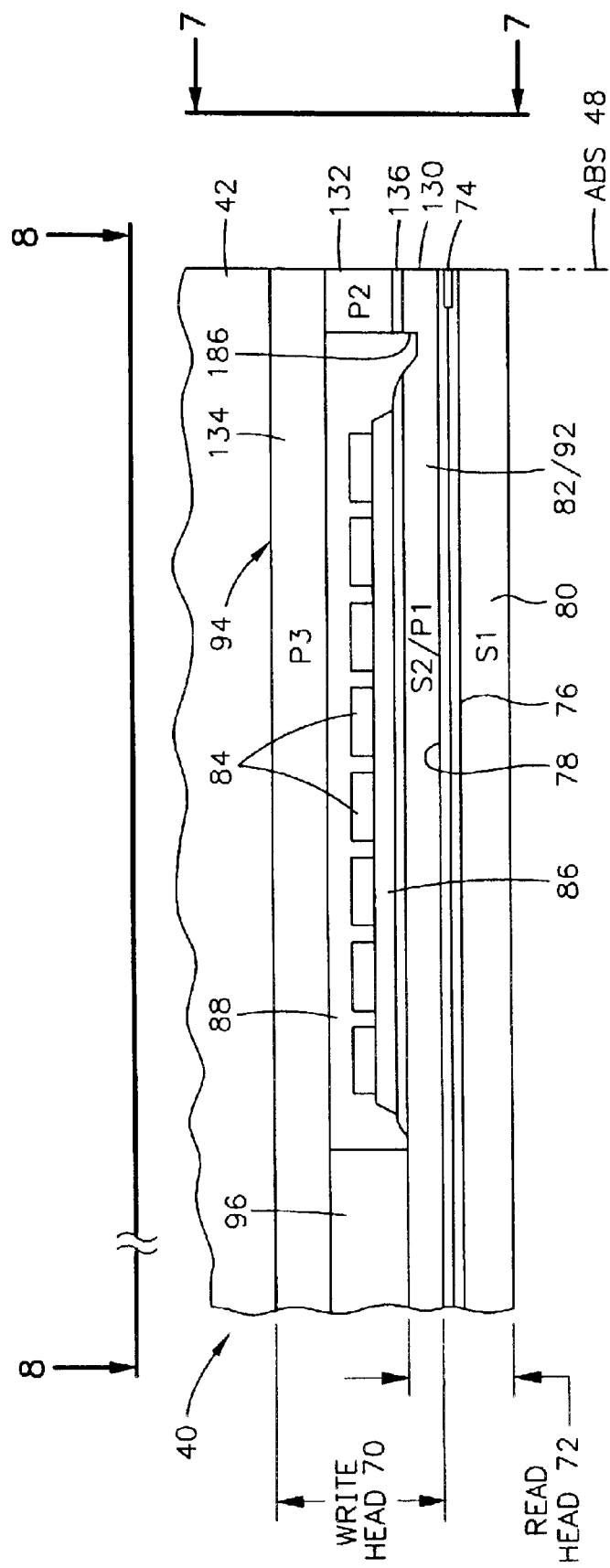
FIG. 6 is a partial view of the slider and the present T-shaped write head as seen in plane 6—6 of FIG. 2, which T-shape is shown in FIG. 7.
Figure 7:
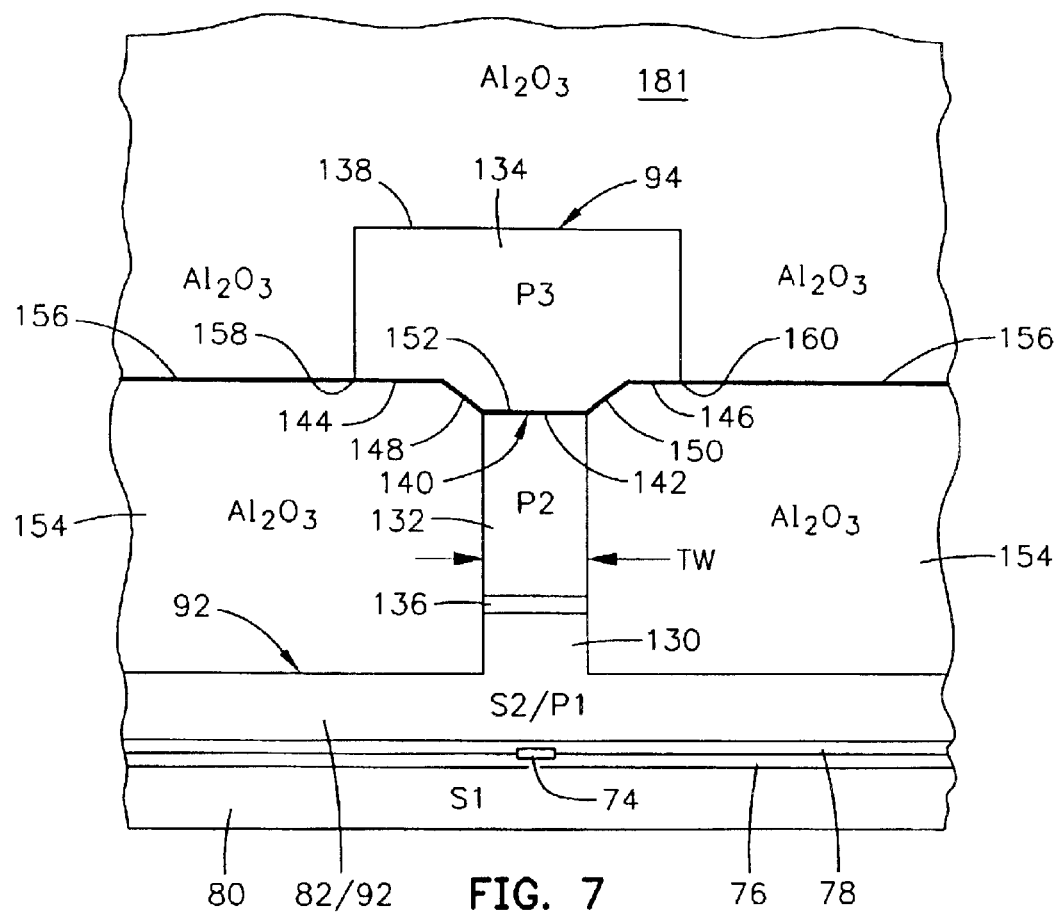
FIG. 7 is a partial ABS view of the slider taken along plane 7—7 of FIG. 6 to show the read and write elements of the magnetic head and especially the T-shape of the write head.

FIG. 6 is a side cross-sectional elevation view of a merged magnetic head 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
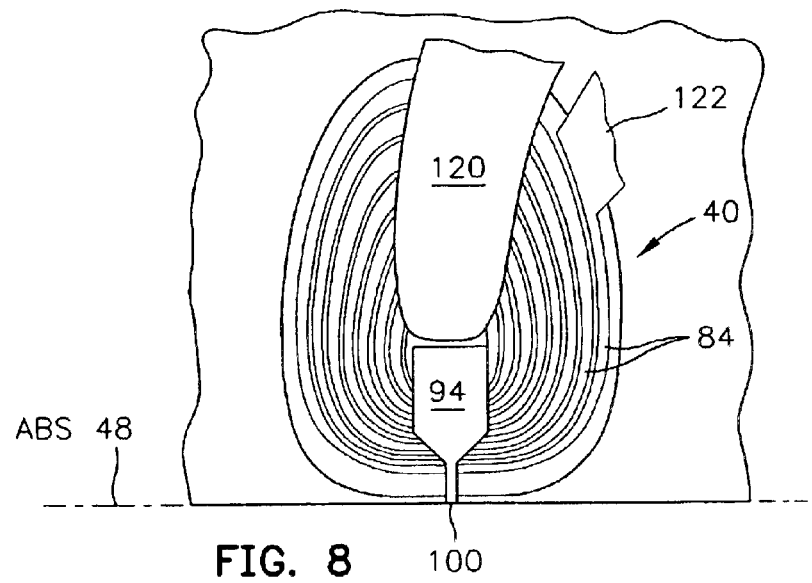
FIG. 8 is a view taken along plane 8—8 of FIG. 6 with all material above the coil layer and leads removed.

The write head portion 70 of the magnetic head 40 includes a coil layer 84 sandwiched between first and second insulation layers 86 and 88. The first and second insulation layers are referred to in the art as an "insulation stack". The coil layer 84 and the first and second insulation layers 86 and 88 are sandwiched between first and second pole pieces 92 and 94. The first and second pole pieces 92 and 94 are magnetically coupled with a back gap component 96 at a back gap. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

The Invention

As shown in FIGS. 6 and 7, a pole tip portion of the first pole piece 92 comprises a first pole tip component (P1) 130 and a pole tip portion of the second pole piece 94 comprises second and third pole tip components (P2) and (P3) 132 and 134. A write gap layer 136 is located between the first and second pole tip components 130 and 132. The second pole tip component 132 has a width which defines the track width (TW) of the write head. The first pole tip component 130 may be fabricated by notching the first pole piece 92 so as to shape it into a pedestal directly below the second pole tip component 132 with a width which is equal to the track width.

The third pole tip component 134 has top and bottom surfaces 138 and 140. The bottom surface has first, second, third, fourth and fifth bottom surface portions 142, 144, 146, 148 and 150. The bottom surface portion 142 interfaces a top surface 152 of the second pole tip component so that the second and third pole tip components 132 and 134 are magnetically coupled with respect to each other. The bottom surface portion 142 has a width which is equal to the top surface 152 as well as being equal to the track width (TW). The second and third bottom surface portions 144 and 146 are parallel to the first bottom surface portion 142. The fourth bottom surface portion 148 extends at an angle between the first bottom surface portion 142 and the second bottom surface portion 144 and the fifth bottom surface portion 150 extends between the first bottom surface portion 142 and the third bottom surface portion 146. Filling in both sides of the pedestal 130, the gap layer 136, the second pole tip component 132 and the fourth and fifth bottom surface portions 148 and 150 is a nonmagnetic electrically nonconductive fill layer 154 which is preferably alumina ($Al_2O_3$). The fill layer has a top surface 156 which is coplanar with the second and third bottom surface portions 144 and 146. With the present invention the third pole tip component 134 has first and second corners 158 and 160 at the ABS which are more remotely located with respect to the first pole tip component 92 because of the additional spacing provided by the fourth and fifth bottom surface portions 148 and 150 which slope upwardly from the bottom surface portion 142.

Figure 9:
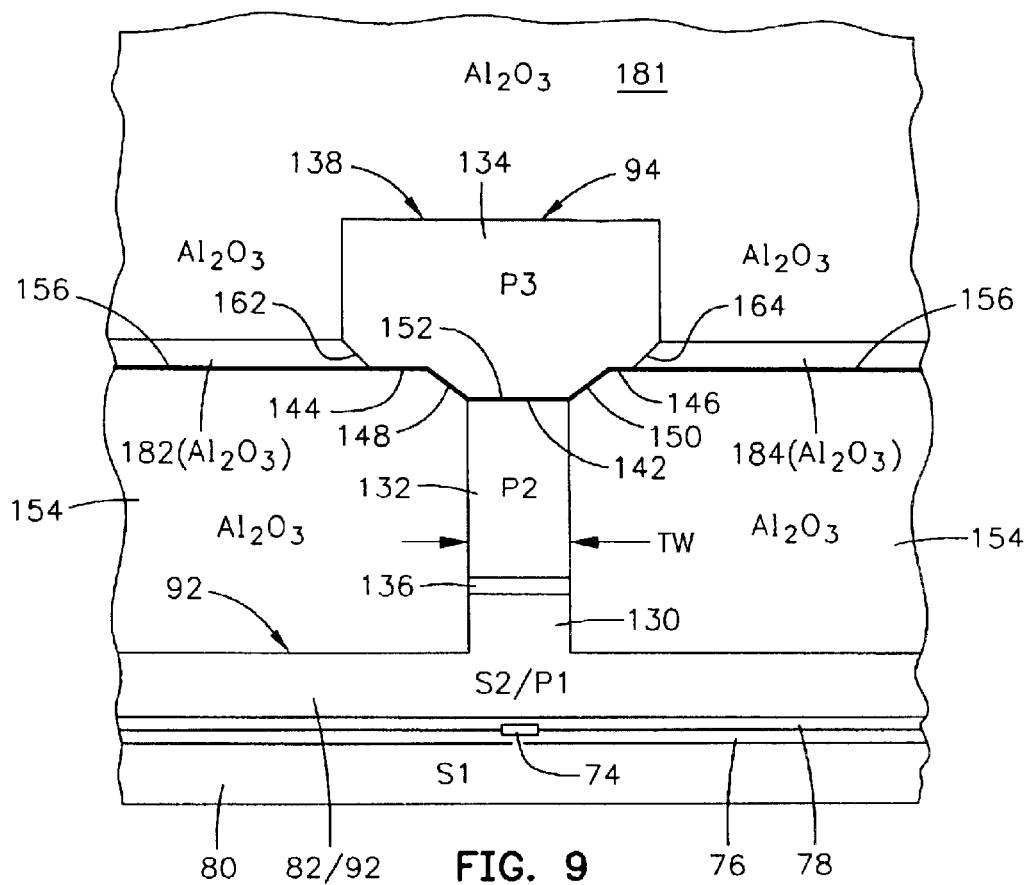
FIG. 9 is the same as FIG. 7 except for a modification of P3.

FIG. 9 illustrates another embodiment of the present invention. FIG. 9 is the same as FIG. 7 except the bottom surface of the third pole tip component has sixth and seventh bottom surface portions 162 and 164. The bottom surface portions 162 and 164 obviate the corners 158 and 160 in the embodiment shown in FIG. 7 so as to still further minimize flux leakage between the third pole tip component 134 and the first pole tip component 92, thereby further minimizing side writing. The sixth and seventh bottom surface portions 162 and 164 are contiguous with the second and third bottom surface portions 144 and 146 and slope at an angle with respect thereto.

The Method of Making

Figure 10:
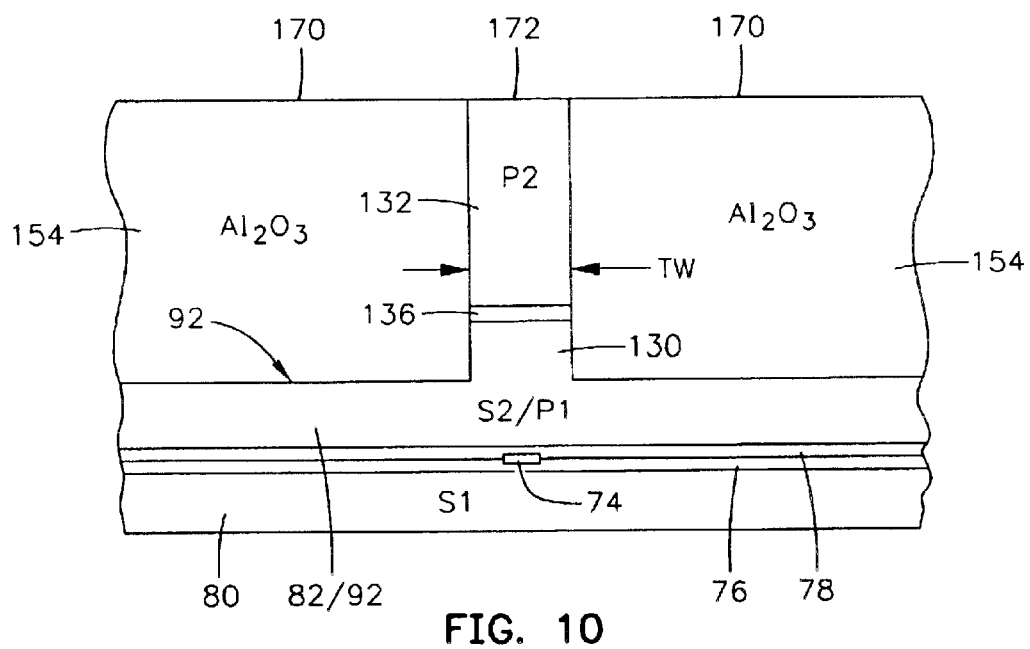
FIG. 10 is an ABS view of a partially completed head wherein top surfaces of P3 and a shaping layer have been planarized.

FIGS. 10–13 show a method of making the embodiment shown in FIG. 7. In FIG. 10 the fill shaping layer 154 is sputter deposited and then planarized with a pre-ion milled top surface portion 170 that is coplanar with a pre-ion milled top surface portion 172 of the second pole tip component. This planarization may be accomplished by chemical mechanical polishing (CMP) which involves polishing the top surfaces in the presence of a chemical which enhances the planarization and is well known in the prior art.

Figure 11:
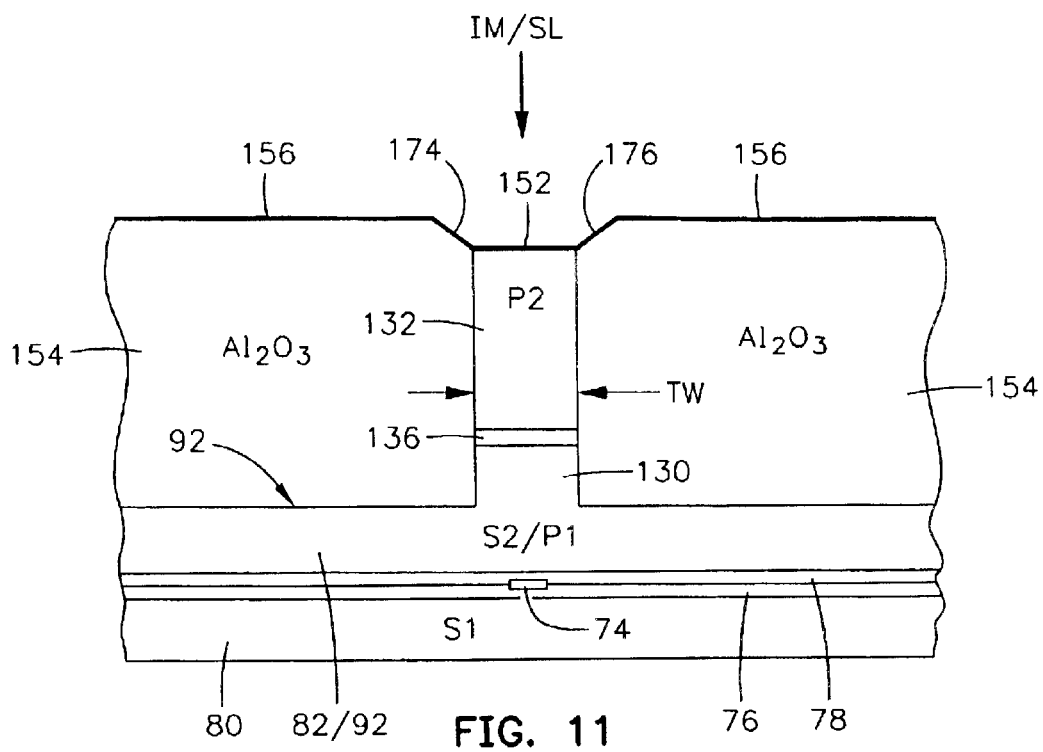
FIG. 11 is the same as FIG. 9 except ion milling has been implemented to form a depression in the top surface of P2.

In FIG. 11 the top surfaces 170 and 172 are subjected to ion milling while the partially completed head is rotated about a vertical axis. The ion milling is preferably accomplished with argon (Ar) ions with the milling angle being between 0° to 10° to a normal to the top surfaces 170 and 172 in FIG. 10 as well as a normal to the major planes of the thin film layers of the read and write head portions. Since the ferromagnetic material of the second pole tip component 132 mills approximately twice as fast as the alumina of the shaping layer 154 a depression is formed in the shaping layer with the second pole tip component and the shaping layer now having the aforementioned top surfaces 152 and 156. Because of the ion milling during rotation of the partially completed head the shaping layer has first and second sloping surfaces 174 and 176 which slope at an angle of approximately 45° to the top surface 152 of the second pole tip component.

Figure 12:
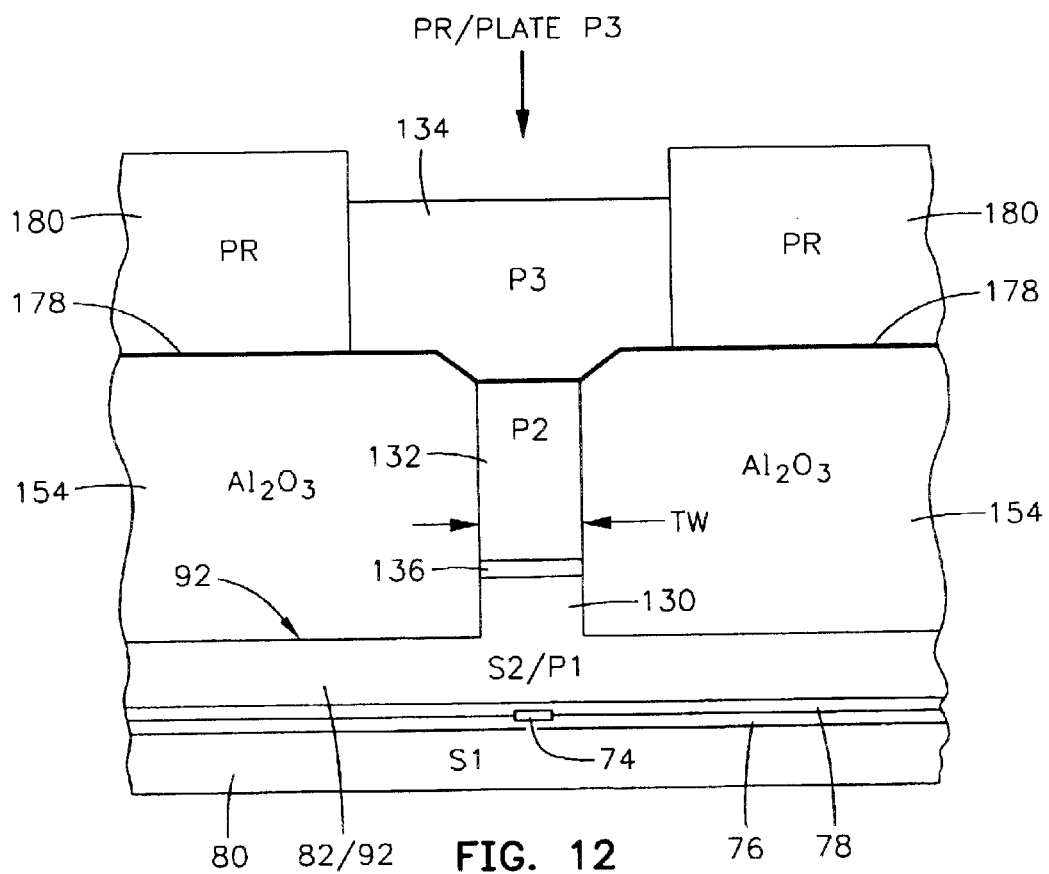
FIG. 12 is the same as FIG. 10 except a photoresist frame has been formed and P3 has been plated.
Figure 13:
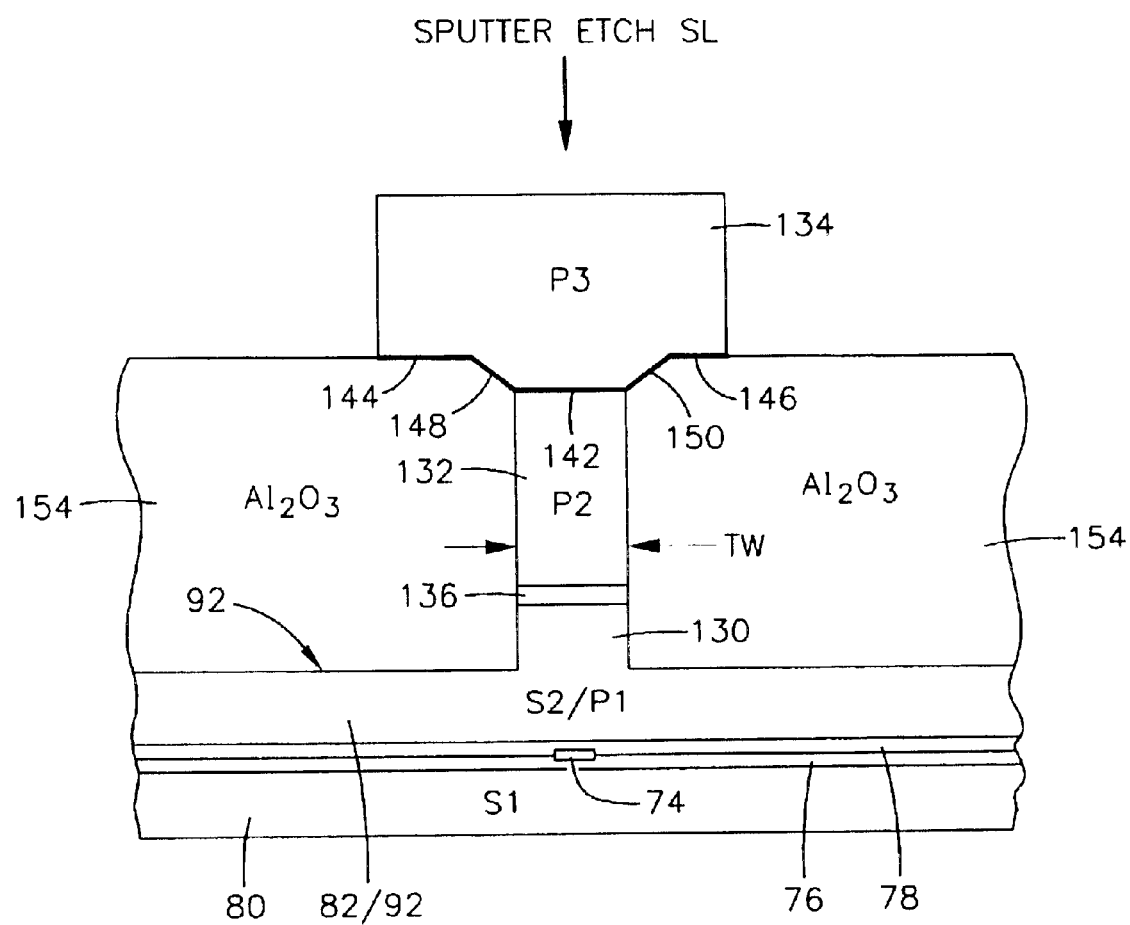
FIG. 13 is the same as FIG. 11 except the photoresist frame has been removed.

In FIG. 12 a seed layer 178 is sputter deposited on the partially completed head and a photoresist frame (PR) 180 is formed. The photoresist frame 180 is formed by spinning a layer of photoresist on the partially completed head, light exposing the photoresist layer in the area to be removed, assuming that the photoresist is a positive photoresist, and then developing the photoresist to provide the opening shown in FIG. 12. The third pole tip component (P3) 134 is then electroplated in the opening and the photoresist frame 180 is removed leaving the third pole tip component 134 with the first, second, third, fourth and fifth bottom surface portions 142, 144, 146, 148 and 150, as shown in FIG. 13. In FIG. 13 the seed layer (SL) is removed by etching and in FIG. 7 a cap layer 181 of aluminum oxide ($Al_2O_3$) is formed on top of the layer 156 and the third pole tip component 134.

The embodiment shown in FIG. 9 may be constructed by partially forming the third pole tip component to approximately a height level with the tops of alumina layers 182 and 184 and then depositing another refill shaping layer to that level and ion milling in the same manner as shown in FIG. 11. This will provide the additional refill shaping layer with sloping surfaces so that after a second frame plating the remainder of the third pole tip component can be frame plated with the sixth and seventh bottom surface portions 162 and 164 as shown in FIG. 9.

After forming the first shield layer 80 the first read gap layer 76, the sensor 74, the second read gap layer 78, the second shield and first pole piece 82/92, the read gap layer 102 and the second pole tip component P2, ion milling may be implemented (not shown) while rotating the partially completed head. With the second pole tip component P2 serving as a mask the second shield layer and first pole piece 82/92 is notched so as to form the first pole tip component 130, as seen in FIG. 7. As seen in FIG. 6 this also notches the back side of the first pole tip component at 186.

Discussion

It should be noted that the third pole tip component is slightly offset to the left as shown in FIGS. 7 and 13. This exemplary illustration is because of process variations in the frame plating step shown in FIG. 12. It should be noted that in spite of these process variations that the first bottom surface portion 142, as shown in FIG. 7, is self-aligned with the top surface 152 of the second pole tip. It should further be understood that the making of the present invention is normally accomplished on a wafer with rows and columns of magnetic heads. This wafer is rotated during the ion milling step in FIG. 11. After completion of the rows and columns of magnetic head assemblies the wafer is diced into rows of magnetic head assemblies and lapped to the ABS. The rows of magnetic head assemblies are then diced into individual magnetic head assemblies which are mounted on suspensions of the magnetic disk drive shown in FIGS. 3 and 4.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic write head comprising the steps of:

forming ferromagnetic first and second pole pieces in pole tip, yoke and back gap regions wherein the yoke region is located between the pole tip and back gap regions;

forming a nonmagnetic electrically nonconductive write gap layer between the first and second pole pieces in the pole tip region;

forming an insulation stack with at least one coil layer embedded therein between the first and second pole pieces in the yoke region;

connecting the first and pole pieces at said back gap region;

forming first, second and third pole tip components which form a portion of the ABS with the pole tip portion of the first pole piece comprising the first pole tip component and the pole tip portion of the second pole piece comprising the second and third pole tip components;

forming the second pole tip component between the first and third pole tip components and the write gap layer between the first and second pole tip components;

further forming the second pole tip component with a width at the ABS that defines a track width of the write head;

further forming the third pole tip component with top and bottom surfaces with a first bottom surface portion of the bottom surface interfacing the second pole tip component and having a width that is equal to the width of the second pole tip component;

further forming the top surface of the third pole tip component with a width that is greater than the width of the first bottom surface portion;

forming said bottom surface with second and third bottom surface portions which are parallel to said first bottom surface portion;

forming the bottom surface with a fourth bottom surface portion which extends between the first bottom surface portion and the second bottom surface portion with a surface of the fourth bottom surface portion forming an obtuse angle with respect to a surface of the first bottom surface portion and the bottom surface with a fifth bottom surface portion which extends between the first bottom surface portion and the third bottom surface portion with a surface of the fifth bottom surface portion forming an obtuse angle with respect to the surface of the first bottom surface portion; and forming the bottom surface of the third pole tip component with sixth and seventh bottom surface portions with the second bottom surface portion located between the fourth bottom surface portion and the sixth bottom surface portion, with the third bottom surface portion located between the fifth bottom surface portion and the seventh bottom surface portion with a surface of the sixth bottom surface portion forming an obtuse angle with respect to a surface of the second bottom surface portion and a surface of the seventh bottom surface portion forming an obtuse angle with respect to a surface of the third bottom surface portion.

2. The method of making a magnetic write head as claimed in claim 1 including the steps of:

forming a nonmagnetic electrically nonconductive shaping layer that has top and bottom surfaces; and forming the top surface of the shaping layer coplanar with the second and third bottom surface portions.

3. A method of making a magnetic write head comprising the steps of:

forming ferromagnetic first and second pole pieces in pole tip, yoke and back gap regions wherein the yoke region is located between the pole tip and back gap regions;

forming a nonmagnetic electrically nonconductive write gap layer between the first and second pole pieces in the pole tip region;

forming an insulation stack with at least one coil layer embedded therein between the first and second pole pieces in the yoke region;

connecting the first and second pole pieces at said back gap region;

forming first, second and third pole tip components which form a portion of the ABS with the pole tip portion of the first pole piece comprising the first pole tip component and the pole tip portion of the second pole piece comprising the second and third pole tip components;

forming the second pole tip component between the first and third pole tip components and the write gap layer between the first and second pole tip components;

further forming the second pole tip component with a width at the ABS that defines a track width of the write head;

further forming the third pole tip component with top and bottom surfaces with a first bottom surface portion of the bottom surface interfacing the second pole tip component and having a width that is equal to the width of the second pole tip component;

further forming the top surface of the third pole tip component with a width that is greater than the width of the first bottom surface portion;

forming said bottom surface with second and third bottom surface portions which are parallel to said first bottom surface portion;

forming the bottom surface with a fourth bottom surface portion which extends between the first bottom surface portion and the second bottom surface portion at an angle α of 45° to the first bottom surface portion and the bottom surface with a fifth bottom surface portion which extends between the first bottom surface portion and the third bottom surface portion at an angle β to the first bottom surface portion;

forming the bottom surface of the third pole tip component with sixth and seventh bottom surface portions which are at an angle to the second and third bottom surface portions respectively;

forming the second bottom surface portion between the fourth bottom surface portion and the six bottom surface portion and forming the third bottom surface portion between the fifth bottom surface portion and the seventh bottom surface portion;

forming a nonmagnetic electrically nonconductive shaping layer that has top and bottom surfaces; and forming the top surface of the shaping layer coplanar with the second and third bottom surface portions.

4. A method of making a magnetic write head comprising the steps of:

forming ferromagnetic first and second pole pieces in pole tip, yoke and back gap regions wherein the yoke region is located between the pole tip and back gap regions;

forming a nonmagnetic electrically nonconductive write gap layer between the first and second pole pieces in the pole tip region;

forming an insulation stack with at least one coil layer embedded therein between the first and second pole pieces in the yoke region;

connecting the first and second pole pieces at said back gap region;

forming first, second and third pole tip components which form a portion of the ABS with the pole tip portion of the first pole piece comprising the first pole tip component and the pole tip portion of the second pole piece comprising the second and third pole tip components;

forming the second pole tip component between the first and third pole tip components and the write gap layer between the first and second pole tip components;

further forming the second pole tip component with a width at the ABS that defines a track width of the write head;

further forming the third pole tip component with top and bottom surfaces with a first bottom surface portion of the bottom surface interfacing the second pole tip component and having a width that is equal to the width of the second pole tip component;

further forming the top surface of the third pole tip component with a width that is greater than the width of the first bottom surface portion;

forming said bottom surface with second and third bottom surface portions which are parallel to said first bottom surface portion;

forming the bottom surface with a fourth bottom surface portion which extends between the first bottom surface portion and the second bottom surface portion at an angle $\alpha$ of 45° to the first bottom surface portion and the bottom surface with a fifth bottom surface portion which extends between the first bottom surface portion and the third bottom surface portion at an angle $\beta$ to the first bottom surface portion;

the step of forming the third pole tip component including the steps of:

forming a shaping layer with top and bottom surfaces before forming the third pole tip component with the top surface of the shaping layer coplanar with a top surface of the second pole tip component;

while rotating the second pole tip component and the shaping layer ion milling the top surfaces of the second pole tip component and the shaping layer to provide a depression in the top surface of the second pole tip component; and frame plating the third pole tip component with the third pole tip component filling the depression and interfacing the first bottom surface portion with the second pole tip component.

5. The method of making a magnetic write head as claimed in claim 4 wherein the ion milling is performed at an angle between 0° to 10° to a normal to the first bottom surface portion.

6. The method of making a magnetic write head as claimed in claim 5 including the steps of:

forming the bottom surface of the third pole tip component with sixth and seventh bottom surface portions which are at an angle to the second and third bottom surface portions respectively; and forming the second bottom surface portion between the fourth bottom surface portion and the six bottom surface portion and forming the third bottom surface portion between the fifth bottom surface portion and the seventh bottom surface portion.

7. A method of making a magnetic head assembly that has an air bearing surface (ABS), comprising the steps of:

making a write head including the steps of:

forming ferromagnetic first and second pole pieces in pole tip, yoke and back gap regions wherein the yoke region is located between the pole tip and back gap regions;

forming a nonmagnetic electrically nonconductive write gap layer between the first and second pole pieces in the pole tip region;

forming an insulation stack with at least one coil layer embedded therein between the first and second pole pieces in the yoke region;

connecting the first and second pole pieces at said back gap region;

forming first, second and third pole tip components which form a portion of the ABS with the pole tip portion of the first pole piece comprising the first pole tip component and the pole tip portion of the second pole piece comprising the second and third pole tip components;

forming the second pole tip component between the first and third pole tip components and the write gap layer between the first and second pole tip components;

further forming the second pole tip component with a width at the ABS that defines a track width of the write head;

further forming the third pole tip component with top and bottom surfaces with a first bottom surface portion of the bottom surface interfacing the second pole tip component and having a width that is equal to the width of the second pole tip component;

further forming the top surface of the third pole tip component with a width that is greater than the width of the first bottom surface portion;

forming said bottom surface with second and third bottom surface portions which are parallel to said first bottom surface portion;

forming the bottom surface with a fourth bottom surface portion which extends between the first bottom surface portion and the second bottom surface portion with a surface of the fourth bottom surface portion forming an obtuse angle with respect to a surface of the first bottom surface portion and the bottom surface with a fifth bottom surface portion which extends between the first bottom surface portion and the third bottom surface portion with a surface of the fifth bottom surface portion forming an obtuse angle with respect to the surface of the first bottom surface portion; and forming the bottom surface of the third pole tip component with sixth and seventh bottom surface portions with the second bottom surface portion located between the fourth bottom surface portion and the sixth bottom surface portion, with the third bottom surface portion located between the fifth bottom surface portion and the seventh bottom surface portion with a surface of the sixth bottom surface portion forming an obtuse angle with respect to a surface of the second bottom surface portion and a surface of the seventh bottom surface portion forming an obtuse angle with respect to a surface of the third bottom surface portion;

making a read head including the steps of:

forming nonmagnetic electrically nonconductive first and second read gap layers;

forming a read sensor between the first and second read gap layers; and forming a first shield layer with the first and second read gap layers located between the first shield layer and the first pole piece layer.

8. A method of making a magnetic head assembly that has an air bearing surface (ABS), comprising the steps of:

making a write head including the steps of:

forming ferromagnetic first and second pole pieces in pole tip, yoke and back gap regions wherein the yoke region is located between the pole tip and back gap regions;

forming a nonmagnetic electrically nonconductive write gap layer between the first and second pole pieces in the pole tip region;

forming an insulation stack with at least one coil layer embedded therein between the first and second pole pieces in the yoke region;

connecting the first and second pole pieces at said back gap region;

forming first, second and third pole tip components which form a portion of the ABS with the pole tip portion of the first pole piece comprising the first pole tip component and the pole tip portion of the second pole piece comprising the second and third pole tip components;

forming the second pole tip component between the first and third pole tip components and the write gap layer between the first and second pole tip components;

further forming the second pole tip component with a width at the ABS that defines a track width of the write head;

further forming the third pole tip component with top and bottom surfaces with a first bottom surface portion of the bottom surface interfacing the second pole tip component and having a width that is equal to the width of the second pole tip component;

further forming the top surface of the third pole tip component with a width that is greater than the width of the first bottom surface portion;

forming said bottom surface with second and third bottom surface portions which are parallel to said first bottom surface portion;

forming the bottom surface with a fourth bottom surface portion which extends between the first bottom surface portion and the second bottom surface portion at an angle α to the first bottom surface portion and the bottom surface with a fifth bottom surface portion which extends between the first bottom surface portion and the third bottom surface portion at an angle β to the first bottom surface portion;

the step of forming the third pole tip component including the steps of:

forming a shaping layer with top and bottom surfaces before forming the third pole tip component with the top surface of the shaping layer coplanar with a top surface of the second pole tip component;

while rotating the second pole tip component and the shaping layer ion milling the top surfaces of the second pole tip component and the shaping layer to provide a depression in the top surface of the second pole tip component; and frame plating the third pole tip component with the third pole tip component filling the depression and interfacing the first bottom surface portion with the second pole tip component;

making a read head including the steps of:

forming nonmagnetic electrically nonconductive first and second read gap layers;

forming a read sensor between the first and second read gap layers; and forming a first shield layer with the first and second read gap layers located between the first shield layer and the first pole piece layer.

9. The method of making a magnetic head assembly as claimed in claim 8 including the steps of:

forming the bottom surface of the third pole tip component with sixth and seventh bottom surface portions which are at an angle to the second and third bottom surface portions respectively; and forming the second bottom surface portion between the fourth bottom surface portion and the six bottom surface portion and forming the third bottom surface portion between the fifth bottom surface portion and the seventh bottom surface portion.

* * * * *